United States Patent
Rafaelof

(10) Patent No.: US 6,534,890 B2
(45) Date of Patent: Mar. 18, 2003

(54) DISC DRIVE SPINDLE MOTOR HAVING REDUCED ACOUSTIC NOISE

(75) Inventor: Menachem Rafaelof, Superior, CO (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/963,229

(22) Filed: Sep. 25, 2001

(65) Prior Publication Data

US 2002/0060501 A1 May 23, 2002

Related U.S. Application Data

(60) Provisional application No. 60/237,630, filed on Oct. 3, 2000.

(51) Int. Cl.[7] .................. H02K 5/00; G11B 17/02
(52) U.S. Cl. .................. 310/91; 310/51; 310/67 R; 360/98.07; 360/99.08
(58) Field of Search ............... 310/51, 67 R, 310/91; 360/98.07, 97.02, 97.01, 99.08

(56) References Cited

U.S. PATENT DOCUMENTS

| | | | | |
|---|---|---|---|---|
| 5,334,895 A | * | 8/1994 | Morioka et al. ........ 310/67 R |
| 5,376,850 A | | 12/1994 | Elsing .................. 310/67 R |
| 5,483,398 A | | 1/1996 | Boutaghou ............ 360/97.02 |
| 5,619,389 A | | 4/1997 | Dunfield .............. 360/98.07 |
| 5,666,239 A | | 9/1997 | Pottebaum ............ 360/97.03 |
| 5,694,268 A | | 12/1997 | Dunfield .............. 360/98.07 |
| 5,734,211 A | | 3/1998 | Yu ....................... 310/51 |
| 5,744,881 A | * | 4/1998 | Ishizuka et al. ....... 310/156.26 |
| 5,781,373 A | | 7/1998 | Larson ................. 360/97.02 |
| 5,798,887 A | | 8/1998 | Yoshida ................ 360/99.08 |
| 5,847,476 A | | 12/1998 | Elsing .................. 310/51 |
| 5,925,946 A | | 7/1999 | Weingord ............. 310/51 |
| 5,949,613 A | | 9/1999 | Moir .................... 360/99.08 |
| 5,986,365 A | | 11/1999 | Kuwert et al. |
| 6,038,205 A | * | 3/2000 | Katakura et al. ...... 360/99.08 |
| 6,081,406 A | | 6/2000 | Morris ................. 360/97.01 |
| 6,104,114 A | * | 8/2000 | Takeda et al. ........ 310/67 R |
| 6,104,570 A | | 8/2000 | Pelstring .............. 360/98.07 |
| 6,229,668 B1 | | 5/2001 | Huynh ................. 360/97.01 |
| 6,307,291 B1 | * | 10/2001 | Iwaki et al. ........... 310/261 |
| 6,407,882 B1 | * | 6/2002 | Katahara et al. ...... 310/51 |

FOREIGN PATENT DOCUMENTS

| | | |
|---|---|---|
| JP | 06 335216 A | 12/1994 |
| JP | 07 087698 A | 3/1995 |
| JP | 2000 125507 A | 4/2000 |
| JP | 2000 161346 A | 6/2000 |
| JP | 2000 217298 A | 8/2000 |

* cited by examiner

Primary Examiner—Burton S. Mullins
(74) Attorney, Agent, or Firm—Merchant & Gould P.C.

(57) ABSTRACT

A disc drive spindle motor for reducing the idle noise of a disc drive includes a stator having a first cylindrical surface for contacting a motor mount of the spindle motor. The motor mount includes a second cylindrical surface for contacting only a portion of the first cylindrical surface of the stator to reduce the transmission of vibrations from the stator to a base plate of the disc drive. The motor mount may be attached to a base plate of the disc drive when the spindle motor is formed separately from the disc drive. Alternatively, the motor mount may be formed integrally with the base plate of the disc drive.

17 Claims, 4 Drawing Sheets

DISC DRIVE SPINDLE MOTOR HAVING REDUCED ACOUSTIC NOISE

RELATED APPLICATIONS

This application claims the benefit of priority of U.S. Provisional Patent Application Serial No. 60/237,630 entitled "Methods For Reduction of Drive Idle Sound" filed Oct. 3, 2000.

FIELD OF THE INVENTION

This application relates to magnetic disc drives and more particularly to an improved hard disc drive spindle motor that minimizes acoustic noise generated by during idle operation of the disc drive.

BACKGROUND OF THE INVENTION

Disc drives are data storage devices that store digital data in magnetic form on a rotating storage medium on a disc. Modern disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magneto resistive read/write head, is used to transfer data between a desired track and an external environment. During a write operation, data is written onto the disc track and during a read operation the head senses the data previously written on the disc track and transfers the information to the external environment.

A number of factors determine the speed at which data can be stored and read from the discs. These factors include the density of the data tracks on the discs as well as the speed of the radial actuator. A further significant factor in determining the speed of reading and writing data is the speed of the spindle motor itself which determines the rotational speed of the discs. Specifically, disc rotation speed is highly determinative of the time it takes the radial actuator to access a desired track. It is thus desirable in the disc drive art to have high disc rotation speeds in order to reduce track access times. However, increases in disc drive spindle motor speeds lead to increases in both vibration and acoustic noise levels of the entire disc drive.

A spindle motor typically includes a stator, a rotor and a spindle or shaft. The rotor may alternatively rotate with the shaft or the shaft may be stationary so that the rotor rotates about the shaft. Within a disc drive, the rotor includes a hub for supporting one or more of the rigid, magnetic discs. During idle periods (when the disc drive is neither reading nor writing data to the disc), the stator continuously energizes the rotor to overcome wind resistance as well as friction in the bearings as the rotor spins at high speed. Typical spindle motor speeds include 10,000 revolutions per minute and beyond.

There are several different modes of acoustic noise generated by the spindle motor, including bearing interaction and the reaction force on the stator. With respect to the bearing, it has been found that conventional ball bearing systems generate vibrations as the ball roll within their respective raceways. Even high quality bearings will have microscopic defects within either the raceways or the balls which generate vibrations. However, this source of vibration can be reduced through the use of hydrodynamic bearings which do not require a physical interaction between a ball and a raceway.

With respect to stator vibrations, the continuous interaction between the stator and the rotor tends to create a torsional resonance in the stator. That is, as the stator applies a force to the rotor to control the rotational speed of the rotor, a counter-force is applied by the rotor to the stator in the opposite direction. This reaction force causes the stator (which is made up of a number of individual stator laminations) to vibrate. Furthermore, stator vibrations may occur as a result of the excitation of the stator mass by the application and removal of commutation pulses used to energize the rotor. Commutation pulses are timed, polarization-selected direct current pulses which are directed to sequentially selected stator windings. The rapid rise and fall times of these pulses act as a striking force and set up sympathetic vibrations in the stator structure.

Vibrations within the stator may create acoustic noise either by direct radiation (i.e., from the spindle motor to the air) or through the transmission of vibrations to the disc drive housing (i.e., from the housing to the air). Indeed, it has been determined that, due to the rigid coupling of the stator to the disc drive base plate, stator vibrations transmitted to the base plate of the disc drive represent a significant source of acoustic noise.

Prior attempts to reduce this source of acoustic noise have centered around damping the vibrations while isolating or uncoupling the stator from the base plate through the use of O-rings. Additionally, an encapsulating material has also been applied to at least a portion of the stator to reduce or eliminate vibratory tones emanating from the stator laminations. Both of these methods are described in U.S. Pat. No. 5,694,268 to Dunfield et al., which patent is assigned to the assignee of the present application. However, these prior art solutions require the use of additional components and processing steps during the assembly of the disc drive. Additionally, the use of elastomeric materials such as O-rings or encapsulating material may lead to undesirable outgassing within the disc drive, and the O-rings themselves may experience undesirable "creep" over time. Thus, there is a need in the art to provide a simplified solution for reducing the acoustic noise generated by a spindle motor.

It is with respect to these and other background considerations, limitations and problems that the present invention has evolved.

SUMMARY OF THE INVENTION

The present invention relates to a disc drive having a spindle motor that reduces the idle acoustic noise generated by the disc drive by reducing the transmission of vibrations from a stator of the spindle motor to a base plate of the disc drive.

In accordance with one embodiment of the present invention, a disc drive spindle motor includes a rotating hub for supporting one or more storage discs of the disc drive. The rotating hub includes a magnet which together act as a rotor for the spindle motor. The spindle motor also includes a stator having a plurality of windings for generating an electromagnetic force to drive the rotor. The stator defines a first cylindrical surface for contacting a second cylindrical surface of a motor mount. The motor mount may either be attached to a base plate of the disc drive or it may be formed integrally with the base plate of the drive. The second cylindrical surface of the motor mount only contacts a portion of the first cylindrical surface of the stator so that vibrations carried within a remaining portion of the stator that is not contacted by the motor mount are not transferred to the base plate of the disc drive.

In one embodiment of the invention, the second cylindrical surface of the motor mount engages between 20% and 80% of the surface area of the first cylindrical surface of the stator. In another embodiment of the invention, the range is limited to between 30% and 70%, while a still further preferred embodiment requires the second cylindrical surface of the motor mount to engage approximately 50% of the surface area of the first cylindrical surface of the stator.

The present invention can also be implemented as a disc drive having a base plate, a storage disc, and a spindle motor having a rotating hub that supports the storage disc. The hub includes a magnet that together with the rotating hub forms a rotor for the spindle motor. A stator of the spindle motor generates an electromagnetic force to rotate the rotor. The stator includes a first cylindrical surface having a predetermined surface area. The spindle motor further includes a motor mount having a second cylindrical surface that engages only a portion of the first cylindrical surface of the stator.

The present invention can further be implemented as a disc drive having a spindle motor with a stator and a rotating a hub that supports a storage disc. The disc drive includes means for reducing transmission of vibrations from the stator to a base plate of the disc drive.

These and various other features as well as advantages which characterize the present invention will be apparent from a reading of the following detailed description and a review of the associated drawings.

DETAILED DESCRIPTION

Figure 1:
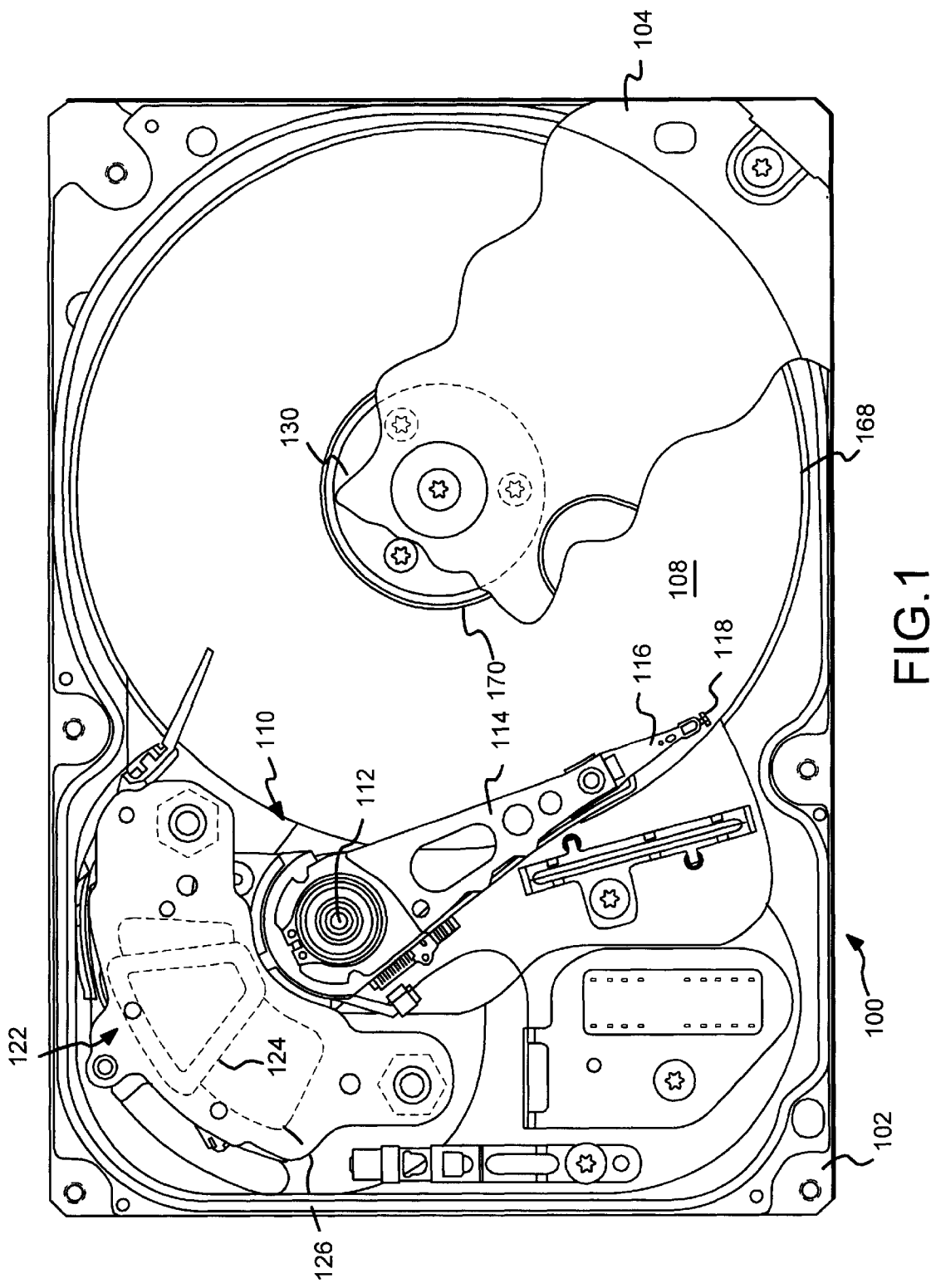
FIG. 1 is a plan view of a disc drive in accordance with a preferred embodiment of the invention.

A disc drive 100 constructed in accordance with a preferred embodiment of the present invention is shown in FIG. 1. The disc drive 100 includes a base plate 102 to which various components of the disc drive 100 are mounted. A top cover 104, shown partially cut away, cooperates with the base 102 to form an internal, sealed environment for the disc drive in a conventional manner. The components include a spindle motor 200 (FIG. 2) for rotating one or more information storage discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

The radial position of the heads 118 is controlled through the use of a voice coil motor (VCM) 122, which typically includes a coil 124 attached to the actuator assembly 110, as well as one or more permanent magnets 126 that establish a magnetic field in which the coil 124 is immersed. The controlled application of current to the coil 124 causes magnetic interaction between the permanent magnets 126 and the coil 124 so that the coil 124 moves in accordance with the well known Lorentz relationship. As the coil 124 moves, the actuator assembly 110 pivots about the bearing shaft assembly 112 and the heads 118 are caused to move across the surfaces of the discs 108. The discs 108 are rotated at a constant high speed by a spindle control circuit, which typically electrically commutates the spindle motor through the use of back electromotive force (BEMF) sensing.

Figure 2:
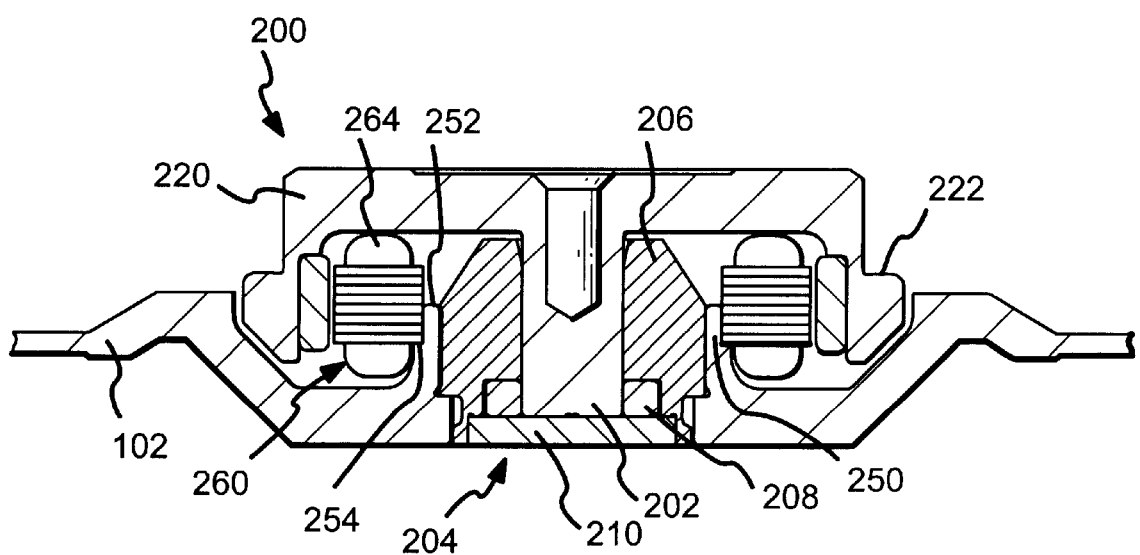
FIG. 2 is a representative sectional view through a disc drive spindle motor showing a reduced height motor mount attached to an inner diameter of a stator in accordance with a first preferred embodiment of the invention.

Referring now to FIG. 2, shown therein is a representational sectional view of the spindle motor 200 of the present invention secured to the base plate 102 of the disc drive 100. The spindle motor 200 is illustrated separately from the discs 108 and the top cover 104 for purposes of clarity. The spindle motor 200 includes a rotating shaft 202 supported for rotation by a fluid dynamic bearing 204. The fluid dynamic bearing 204 includes a sleeve 206 that forms a recess for receiving a thrust plate 208 at one end of the shaft 202. A counter plate 210 cooperates with surfaces of the thrust plate 208 to form a fluid dynamic thrust bearing which supports the shaft 202 for rotation. A fluid dynamic journal bearing is established in a gap (not shown) between the sleeve 206 and the rotating shaft 202 as well as the thrust plate 208 supported on the shaft 202. Specifically, the shaft 202 and the thrust plate 208 are supported for rotation by fluid (preferably a liquid although a gas may also be used) inserted into the gap between the surfaces of the shaft and thrust plate, and the corresponding inner surface of the sleeve 206 and the counter plate 210. A pattern of grooves formed on these surfaces helps to establish appropriate pressures in the fluid used to form the fluid dynamic bearing 204, all in accordance with known technology in the field of hydrodynamic bearings.

A cylindrical shaped hub 220 extends radially outward from the shaft 202 and includes a bottom radial flange 222 and a cylindrical surface 224 extending upward from the flange 222 to support one or more discs 108 (FIG. 1). Once one or more discs 108 are loaded on the hub 220, a clamp ring 130 (FIG. 1) is attached to a top surface 226 of the hub 220 to secure the discs 108 to the hub 220. A magnet 230 is secured to an inner surface of the hub 220 to act as a rotor for the spindle motor 200.

The base plate 102 of the disc drive defines a recessed portion 240 (FIG. 3) for receiving the spindle motor 200. A cylindrical motor mount 250 is centered within the recessed portion 240 and defines an axial opening for receiving the sleeve 206 and counter plate 210 of the fluid dynamic bearing 204. The cylindrical motor mount 250 extends vertically upward and terminates at an upper end 252 that defines an annular ring. An inner cylindrical surface 256 of the cylindrical motor mount 250 supports an outer cylindrical 257 surface of the sleeve 206 as shown in FIGS. 2 and 3, while an outer cylindrical surface 258 (FIG. 3) of the motor mount 250 engages an inner cylindrical surface 259 of a stator 260.

Figure 3:
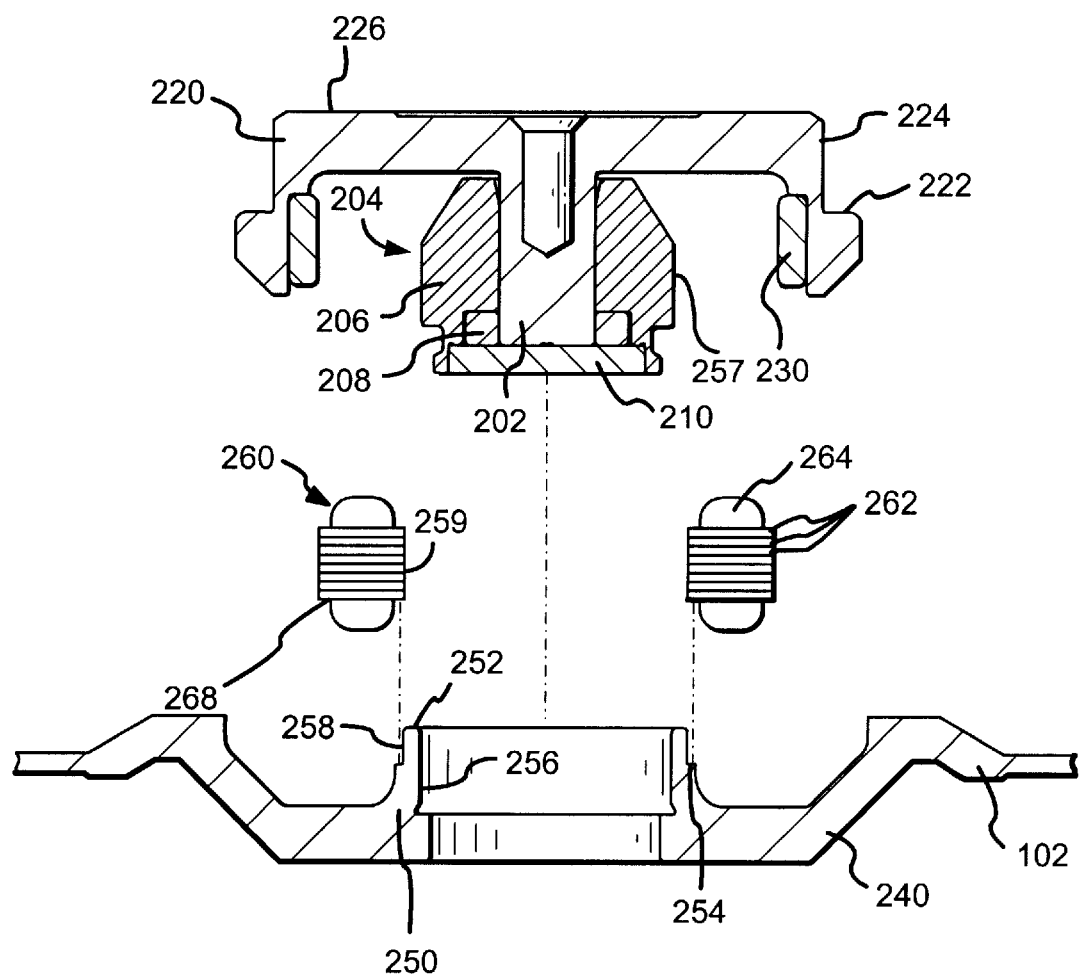
FIG. 3 is an exploded sectional view of the disc drive motor spindle assembly of FIG. 2 where the rotor and bearing assembly have been removed from the motor mount to better illustrate the connection of the stator to the motor mount.

The stator 260 is formed from a stack of stator laminations 262 (eight laminations are shown in FIGS. 2 and 3) and associated stator windings 264. While the stator 260 is preferably press fit around the outer cylindrical surface 258 of the motor mount 250, a bottom stator lamination 268 may be supported by a shoulder 254 formed in the outer cylindrical surface 258 of the motor mount 250. Additionally, the inner cylindrical surface 259 of the stator laminations 262 may be secured to the outer cylindrical surface 258 of the motor mount 250 by an adhesive. It is this hard coupling of the stator 260 to the motor mount 250 (and thus to the base plate 102) of the disc drive 100 that results in the acoustic noise problem discussed above in the background section.

FIG. 3 is identical to FIG. 2 except that the hub 220 and the fluid dynamic bearing 204 of the spindle motor 200 are removed from the base plate 102 in an exploded view to provide a clearer view of the inner cylindrical surface 259 of the stator 260 and the outer cylindrical surface 258 of the motor mount 250. It should be noted that while the motor mount 250 shown in FIGS. 2 and 3 is preferably formed integrally with the base plate 102, it is possible for the motor mount 250 to be formed integrally with the remainder of the spindle motor 200 so that the entire motor 200 (i.e., the rotor and the stator) is formed as a separate unit that may be secured within an opening formed in the base plate 102. It is understood that the present invention may be beneficially used with either type of spindle motor configuration.

As noted above, vibrations within the stator 260 are transferred into acoustic noise by: (1) direct radiation to the air surrounding the stator 260; and (2) transmission of the vibrations to the base plate 102 which then vibrates together with the stator and radiates sound across the larger surface area of the base plate 102. The amplitude of a sound transmitted between two mediums in contact with each other depends both on the amount of common surface area as well as the relative acoustic impedances of the neighboring mediums. The acoustic impedance of a material is equal to the product of the density of the material and the speed of sound in the material. Specifically, the amplitude of a transmitted wave is related to the amplitude of an incident wave by the following formula:

$$A_2 = A_1 * (2\rho_2 c_2)/(\rho_2 c_2 + \rho_1 c_1)$$

where, $A_2$ and $A_1$ are the amplitude of the transmitted and incident waves, respectively;

$\rho_1 c_1$ are the density and the speed of sound for the source medium; and $\rho_2 c_2$ are the density and speed of sound for the neighboring medium.

From the above formula, it is easily seen that the amplitude of a transmitted wave will be closer to the amplitude of an incident wave when the source medium and the neighboring medium have a similar acoustic impedance. On the other hand, the amplitude of a transmitted wave will be much smaller than the incident wave when the acoustic impedance of the neighboring medium (i.e., the product $\rho_2 c_2$) is significantly smaller than the acoustic impedance of the source medium (i.e., the product $\rho_1 c_1$).

In the case of a disc drive spindle motor 200, the stator 260 is typically formed from steel, while the base plate 102 is typically formed from aluminum. Table 1 below compares the acoustic impedance of these two materials, as well as the acoustic impedance of air, to determine the amplitude of a wave transmitted from the stator 260 to either the base plate 102 or the air surrounding the stator.

TABLE 1

| Medium | Density (kg/m³) $\rho$ | Velocity (m/sec) c | Acoustic Impedance $\rho*c$ |
|---|---|---|---|
| Air (at 20 deg. Celsius) | 1.21 | 343 | 415 |
| Aluminum (bulk) | 2700 | 6300 | 17.0e6 |
| Steel (bulk) | 7700 | 6100 | 47.0e6 |

As seen from the above values, it is clear that the acoustic impedance of aluminum is of the same order of magnitude as the acoustic impedance of steel. On the other hand, the acoustic impedance of air is approximately five orders of magnitude below that of either aluminum or steel. Thus, an incident wave within a spindle motor (i.e., a wave generated in the steel stator 260) will be transmitted with more of its original strength through a neighboring aluminum material than through air. Specifically, using the above formula, it is found that $A_2 = 0.53 A_1$ when the source medium is steel (i.e., the stator 260) and the neighboring medium is aluminum (i.e., the base plate 102). Similarly, when the incident wave is transmitted directly from the steel stator 260 to air, it is found that $A_2 = 0.000017 A_1$. Thus, for a given amplitude of an incident wave ($A_1$), the above comparison shows that the transmitted wave ($A_2$) is much larger in the aluminum base plate 102 than in the air surrounding the stator 260.

With the above comparison in mind, the present invention does not seek to cover or encapsulate the stator 260 itself since the benefits of such actions are marginal in terms of reducing acoustic noise. That is, since most of the vibration noise from the stator 260 is transmitted to the base plate 102 rather than the air, the present invention addresses the need to reduce the transmission of vibrations from the stator to the base plate since any such reduction will have a greater effect on disc drive idle noise than a corresponding reduction in the amount of vibrations transferred directly from the stator 260 to the air.

The present invention (shown in two preferred embodiments in FIGS. 2–4) entails reducing the height of the cylindrical motor mount 250 so that the outer cylindrical surface 258 of the motor mount 250 contacts only a portion and not the entire inner cylindrical surface 259 of the stator laminations 262. In the example shown in FIG. 3, the stator 260 is formed from eight separate stator laminations 262. In the preferred embodiment shown in FIGS. 2 and 3, the upper end 252 of the cylindrical motor mount extends approximately half-way up the inner cylindrical surface 259 of the laminations 262 so that the top four stator laminations extend above (and thus are not contacted by) the motor mount 250. In this manner, only the vibrations found in the lower four stator laminations 262 are transmitted to the motor mount 250 (which is part of the base plate 102). This is to be contrasted with prior art designs that extend the motor mount to fully support the entire inner cylindrical surface 259 of the stator 260.

In the preferred embodiment shown in FIGS. 2–3, the cylindrical motor mount 250 has been reduced to approximately one-half of its fall height. Experiments have shown that such a reduction in the surface area contact between the motor mount 250 and the stator 260 results in a approximately a 2.1 decibel reduction in the sound level generated by the disc drive 100 during idle operation (i.e., when there is no movement of the actuator assembly 110). These results were obtained with cast base plates 102 where the motor mount is cast integrally with the remainder of the plate 102. Smaller improvements, on average, were obtained when the motor mount 250 was machined from the base plate 102 rather than cast. A 1.3 decibel reduction was obtained with machined base plates.

While FIGS. 2–3 illustrate an approximate 50% reduction in the amount of stator surface area that is removed from contact with the motor mount 250, it is noted the present invention envisions a wider range of surface area reductions than that shown in the drawing. Indeed, stator area coverage reductions within the range of 20–80% (and more preferably within the range of 30–70%) are encompassed by the present invention. At the higher end of the range (where even less of the stator surface area is contacted by the motor mount 250), it is expected that even larger decreases in acoustic noise may be achieved. At present, a 70% reduction in stator area coverage (i.e., where the motor mount contacts approximately 30% of the cylindrical surface of the stator) is believed to provide the best balance between reducing acoustic noise while maintaining a sufficiently strong connection between the stator and the motor mount.

Figure 4:
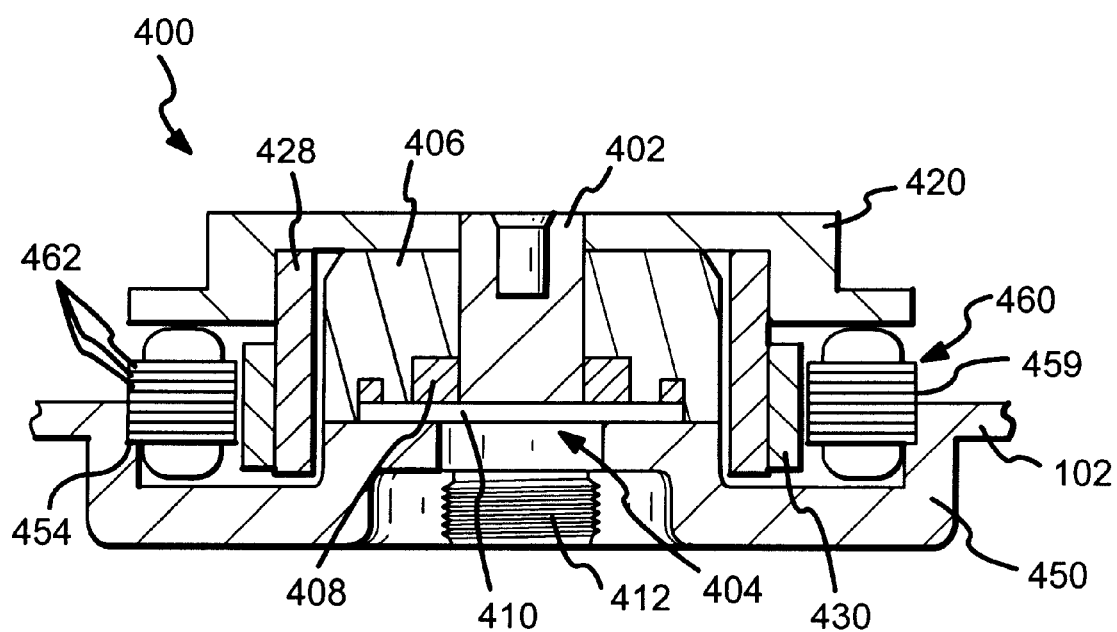
FIG. 4 is a representative sectional view through a disc drive spindle motor similar to FIG. 2 showing a reduced height motor mount attached to an outer diameter of the stator in accordance with a second preferred embodiment of the invention.

As noted above, the present invention may be used with all types of spindle motors, including those where the stator 260 is located radially outside the rotor magnet 230. An example of such an embodiment is shown in FIG. 4 where the stator 460 is located below rather than inside the hub 420. A backiron 428 extends vertically downward from the inner cylindrical surface of the hub 420, and a magnet 430 is secured to an outer surface of the backiron 428 to act as a rotor for the spindle motor 400. Similar to the spindle motor 200 shown in FIGS. 2–3, the motor 400 includes a spinning shaft 402 and a fluid dynamic bearing 404 having a sleeve 406, thrust plate 408 and counter plate 410 that is secured to the base plate 102 by a threaded connection 412 and a nut (not shown).

The spindle motor 400 includes a cylindrical motor mount 450 that is formed as a depression within the base plate 102. An inner cylindrical surface of the mount 450 is secured to an outer cylindrical surface 459 of the stator 460 along the bottom four stator laminations 462. A shoulder 454 defined by the motor mount 450 preferably assists in supporting the stator 460. The spindle motor 400 thus employs the present invention to reduce the surface area contact between the stator 460 and the mount 450 that is formed integrally with the base plate 102. The reduced height of the motor mount 450 (relative to prior art mounts) allows for a relatively smaller depression to be formed in the base plate 102, thereby reducing the overall height of the base plate. The present invention thus has an added benefit of reducing the overall size of the spindle motor 400 which, in turn, may lead to a smaller overall size for the disc drive 100.

In sum, a reduction in surface area between the two neighboring mediums acts to reduce the vibrations transmitted between the two mediums. Prior art designs have typically attempted to achieve a similar result through the use of O-rings that both dampen and isolate the surface area contact between the stator and the motor mount. However, such prior art designs require the use of additional parts and manufacturing steps to place the O-rings in the proper position. Additionally, it is known that elastomeric O-rings will experience material "creep" over time which can alter the position of the spindle motor. Of course, any alteration in the position or operation of the spindle motor adversely affects the operation of the disc drive 100 and can lead to errors in reading and writing data. Thus, the metal-to-metal contact between the stator and motor mount of the present invention (which does not vary over time) provides an additional benefit over prior art O-rings. Furthermore, the use of O-rings within the clean environment of the disc drive 100 can lead to outgassing which, in turn, can lead to stiction between the read/write heads and the disc surface. Thus, the present invention reduces the surface area contact between the stator 260 and the base plate 102 in a manner that does not require the use of additional components such as O-rings.

The present invention encompasses any reduction of the surface area contact between the stator and the motor mount that leads to a reduction in disc drive idle noise, and should not be limited to the disclosed preferred embodiment where approximately a 50% reduction is achieved. Specifically, the present invention relates to reducing the surface area contact by reducing the height of the motor mount so that the mount contacts only a portion of either the inner cylindrical surface 259 (FIGS. 2–3) or the outer cylindrical surface 459 (FIG. 4) of the stator. As discussed above, the present invention encompasses reductions in surface area contact as high as 80% (with a presently preferred reduction of approximately 70%), provided that a sufficient contact surface remains between the stator and the motor mount to prevent the stator from moving relative to the motor mount both in response to external shocks or in response to the counter-torque applied by the rotating rotor magnets. Additionally, reductions in surface area contact smaller than 50% (and as low as 20%) fall within the scope of the present invention since even such small reductions may provide a measurable reduction in the level of acoustic noise that is transferred from the stator to the disc drive base plate.

Furthermore, while the two embodiments shown in FIGS. 2–4 each describe a spindle motor where the motor mount is integrated into the base plate, the present invention may also be used with spindle motors that are built separately from the disc drive (e.g., where the motor mount is attached to a bottom flange of the spindle motor and the bottom flange is in turn secured to the base plate of the disc drive). The only requirement is that the surface area contact between the stator and the motor mount is reduced (relative to prior art spindle motors) without reliance upon extra components such as O-rings being placed between the stator and the motor mount.

The present invention thus achieves a reduction in disc drive idle noise without requiring additional processing steps or additional components. Indeed, the only change is the reduction of the size of the motor mount which is easily achieved during the formation of either the base plate or the base portion of a separately constructed spindle motor. Such a reduction in the amount of material used to form the spindle motor reduces the overall cost of the motor (i.e., reduces the cost of machining the motor mount 250) and may reduce the overall height of the motor as explained above.

In summary, the present invention is a disc drive spindle motor (such as 200 and 400) for reducing acoustic noise generated during idle operation of a disc drive (such as 100). The spindle motor (such as 200 and 400) includes a rotating hub (such as 220 and 420) adapted to support one or more storage discs (such as 108). The rotating hub (such as 220 and 420) includes a magnet (such as 230 and 430) so that the combination of the rotating hub and the magnet acts as a rotor for the spindle motor (such as 200 and 400). The spindle motor further includes a stator (such as 260 and 460) having a plurality of windings (such as 264) for generating an electromagnetic force to drive the rotor. The stator (such as 260 and 460) defines a first cylindrical surface (such as 259 and 459) for contacting a motor mount (such as 250 and 450), where the first cylindrical surface has a predetermined area. The motor mount (such as 250 and 450) defines a second cylindrical surface (such as 258) for engaging a portion of the first cylindrical surface (such as 259 and 459) of the stator (such as 260 and 460).

In one preferred embodiment of the invention, the second cylindrical surface (such as 258) of the motor mount (such as 250 and 450) engages between 20% and 80% of the surface area of the first cylindrical surface (such as 259 and 459) of the stator (such as 260 and 460). A further preferred embodiment of the invention limits that range to between 30% and 70%, while a still further preferred embodiment requires the second cylindrical surface (such as 258) of the motor mount (such as 250 and 450) to engage approximately 50% of the surface area of the first cylindrical surface (such as 259 and 459) of the stator (such as 260 and 460).

One preferred embodiment of the invention includes a rotor which extends radially outward from the stator (such as 260). In this embodiment, the first cylindrical surface constitutes an inner surface (such as 259) of the stator (such as 260), while the second cylindrical surface constitutes an outer surface (such as 258) of the motor mount (such as 250). Additionally, the motor mount (such as 250) is formed as an integral part of the base plate (such as 102) of the disc drive (such as 100).

A further embodiment of the invention positions the stator (such as 460) radially outside of the rotor. In this embodiment, the first cylindrical surface constitutes an outer surface (such as 459) of the stator (such as 460), while the second cylindrical surface constitutes an inner surface of the motor mount (such as 450). Additionally, the motor mount (such as 450) is formed as an integral part of the base plate (such as 102) of the disc drive (such as 100).

A further exemplary preferred embodiment of the present invention includes a disc drive (such as 100) having a base plate (such as 102), a storage disc (such as 108), and a spindle motor (such as 200 and 400). The spindle motor includes a rotating hub (such as 220 and 420) that supports the storage disc (such as 108). The hub includes a magnet (such as 230 and 430) that together with the rotating hub (such as 220 and 420) forms a rotor for the spindle motor (such as 200 and 400). A stator (such as 260 and 460) of the spindle motor includes a plurality of windings (such as 264) for generating an electromagnetic force to drive the rotor. The stator (such as 260 and 460) includes a first cylindrical surface (such as 259 and 459) having a predetermined surface area. The spindle motor further includes a motor mount (such as 250 and 450) having a second cylindrical surface (such as 258) that engages a portion of the first cylindrical surface (such as 259 and 459) of the stator (such as 260).

A further exemplary preferred embodiment of the present invention includes a disc drive (such as 100) that comprises a spindle motor (such as 200 and 400) having a stator (such as 260 and 460) for rotating a hub (such as 220 and 420) that supports a storage disc (such as 108). The disc drive includes means for reducing transmission of vibrations from the stator (such as 260 and 460) to a base plate (such as 102) of the disc drive to reduce acoustic noise during idle operation of the disc drive.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, while the preferred embodiment of the invention is shown with a spindle motor utilizing a rotating shaft and a fluid dynamic bearing, it is understood that spindle motors utilizing fixed shafts and/or other types of bearings (e.g., a ball bearing) may benefit from the present invention. Thus, it is envisioned that any type of spindle motor may be encompassed by the current invention provided that the surface area contact between the stator and the motor mount is reduced as described above. Accordingly, all such modifications, changes and alternatives are encompassed in the spirit of the invention disclosed and as defined in the appended claims.

What is claimed is:

1. A disc drive spindle motor for reducing acoustic noise generated during idle operation of a disc drive, the spindle motor including a rotating hub adapted to support a storage disc and a magnet attached to the rotating hub to form a rotor, the spindle motor comprising:

a stator having a plurality of windings for generating an electromagnetic force to drive the rotor, the stator defining an inner cylindrical surface having a predetermined surface area; and a motor mount defining an outer cylindrical surface engaging between approximately 20 and 40 percent of the predetermined surface area of the inner cylindrical surface of the stator, wherein the motor mount provides the only support for the stator within the spindle motor.

2. The spindle motor of claim 1 wherein the outer cylindrical surface of the motor mount engages approximately 30 percent of the predetermined surface area of the inner cylindrical surface of the stator.

3. The spindle motor of claim 1 wherein the rotor extends radially outward from the stator.

4. The spindle motor of claim 1 wherein the motor mount is formed integrally with a base plate of the disc drive.

5. The spindle motor of claim 4 wherein an inner cylindrical surface of the motor mount engages a sleeve of a fluid dynamic bearing.

6. A disc drive spindle motor for reducing acoustic noise generated during idle operation of a disc drive, the spindle motor including a rotating hub adapted to support a storage disc and a magnet attached to the rotating hub to form a rotor, the spindle motor comprising:

a stator having a plurality of windings for generating an electromagnetic force to drive the rotor, the stator extending radially outside of the rotor and defining an outer cylindrical surface having a predetermined surface area; and a motor mount defining an inner cylindrical surface engaging only a portion of the predetermined surface area of the outer cylindrical surface of the stator.

7. The spindle motor of claim 6 wherein the motor mount is formed integrally with a base plate of the disc drive.

8. The spindle motor of claim 6 wherein the inner cylindrical surface of the motor mount engages between approximately 50 and 80 percent of the predetermined surface area of the outer cylindrical surface of the stator.

9. The spindle motor of claim 6 wherein the inner cylindrical surface of the motor mount engages between approximately 20 and 50 percent of the predetermined surface area of the outer cylindrical surface of the stator.

10. The spindle motor of claim 6 wherein the inner cylindrical surface of the motor mount engages approximately 50 percent of the predetermined surface area of the outer cylindrical surface of the stator.

11. The spindle motor of claim 6 wherein the inner cylindrical surface of the motor mount engages approximately 30 percent of the predetermined surface area of the outer cylindrical surface of the stator.

12. A disc drive comprising:

a base plate;

a storage disc; and a spindle motor comprising:

a rotating hub supporting the storage disc, the rotating hub including a magnet to form a rotor for the spindle motor;

a stator having a plurality of windings for generating an electromagnetic force to drive the rotor, the stator extending radially outside of the rotor and defining an outer cylindrical surface having a predetermined surface area; and a motor mount defining an inner cylindrical surface engaging only a portion of the predetermined surface area of the outer cylindrical surface of the stator.

13. The disc drive of claim 12 wherein the inner cylindrical surface of the motor mount engages between approximately 50 and 80 percent of the predetermined surface area of the outer cylindrical surface of the stator.

14. The disc drive of claim 12 wherein the inner cylindrical surface of the motor mount engages between approximately 20 and 50 percent of the predetermined surface area of the outer cylindrical surface of the stator.

15. The disc drive of claim 12 wherein the inner cylindrical surface of the motor mount engages approximately 50 percent of the predetermined surface area of the outer cylindrical surface of the stator.

16. The disc drive of claim 12 wherein the inner cylindrical surface of the motor mount engages approximately 30 percent of the predetermined surface area of the outer cylindrical surface of the stator.

17. The disc drive of claim 12 wherein the motor mount is formed integrally with the base plate of the disc drive.

* * * * *